US011261575B2

(12) United States Patent
Madsen et al.

(10) Patent No.: US 11,261,575 B2
(45) Date of Patent: Mar. 1, 2022

(54) SEGMENTED SUCTION BUCKET

(71) Applicants: Siemens Gamesa Renewable Energy A/S, Brande (DK); Aalborg University, Aalborg (DK); Universal Foundation A/S, Fredericia (DK)

(72) Inventors: Finn Daugaard Madsen, Billund (DK); Johnny Soerensen, Videbæk (DK); Jens Thomsen, Brande (DK); Lars Bo Ibsen, Aalborg (DK); Soeren Andreas Langbak Nielsen, Fjerritslev (DK); Nicolai Hallum Steensgaard, Horsens (DK); Morten Kristiansen, Støvring (DK); Arne Kryger, Langeskov (DK); Poul Henrik Kyvsgaard Hansen, Aalborg (DK); Sigurd Villumsen, Harlev J (DK)

(73) Assignees: AALBORG UNIVERSITY, Aalborg (DK); SIEMENS GAMESA RENEWABLE ENERGY A/S, Brande (DK); UNIVERSAL FOUNDATION A/S, Fredericia (DK)

( * ) Notice: Subject to any disclaimer, the term of this patent is extended or adjusted under 35 U.S.C. 154(b) by 0 days.

(21) Appl. No.: 16/639,363

(22) PCT Filed: Aug. 13, 2018

(86) PCT No.: PCT/EP2018/071938
§ 371 (c)(1),
(2) Date: Feb. 14, 2020

(87) PCT Pub. No.: WO2019/034616
PCT Pub. Date: Feb. 21, 2019

(65) Prior Publication Data
US 2020/0248423 A1    Aug. 6, 2020

(30) Foreign Application Priority Data

Aug. 17, 2017 (EP) .................... 17186731

(51) Int. Cl.
*E02B 17/00* (2006.01)
*B23K 9/02* (2006.01)
*E02D 27/52* (2006.01)

(52) U.S. Cl.
CPC ............... *E02B 17/00* (2013.01); *B23K 9/02* (2013.01); *E02D 27/525* (2013.01);
(Continued)

(58) Field of Classification Search
CPC .............................. E02D 27/525; B63B 21/27
See application file for complete search history.

(56) References Cited

U.S. PATENT DOCUMENTS 7,464,512 B1 * 12/2008 Perina .................... E04H 12/08
52/651.01
8,250,833 B2 * 8/2012 Thomsen ............... E04H 12/085
52/845
(Continued)

FOREIGN PATENT DOCUMENTS

AU    7166194 A    4/1996
CN    2507914 Y    8/2002
(Continued)

OTHER PUBLICATIONS

International Search Report and Written Opinion of the International Searching Authority for related PCT Patent Application No. PCT/EP2018/071938, dated Nov. 2, 2018. 12 pages.
(Continued)

*Primary Examiner* — Sean D Andrish
(74) *Attorney, Agent, or Firm* — Schmeiser, Olsen & Watts LLP

(57) ABSTRACT

A suction bucket for a seabed foundation for an offshore facility is provided. The suction bucket is arranged for being
(Continued)

embedded into a marine sediment. The suction bucket includes a lid and a sidewall. The sidewall is segmented into a first circumferential segment and at least a second circumferential segment. The first circumferential segment is connected with the second circumferential segment. The first circumferential segment and the second circumferential segment are attached to the lid of the suction bucket. Furthermore, the first circumferential segment and the second circumferential segment each contains at least one substantially planar section. Furthermore, a method to manufacture a suction bucket for a seabed foundation for an offshore facility is also provided.

14 Claims, 11 Drawing Sheets

(52) U.S. Cl.
CPC ............... *E02B 2017/0065* (2013.01); *E02B 2017/0078* (2013.01); *E02B 2017/0091* (2013.01)

(56) References Cited

U.S. PATENT DOCUMENTS

| | | | |
|---|---|---|---|
| 9,062,662 B1 | 6/2015 | Johnson et al. | |
| 2007/0294955 A1* | 12/2007 | Sportel | F03D 13/10 52/40 |
| 2012/0093587 A1* | 4/2012 | Finn | B63B 35/4406 405/200 |
| 2012/0230773 A1 | 9/2012 | Foo et al. | |
| 2017/0016299 A1* | 1/2017 | Faircloth | H01S 3/0071 |
| 2018/0266069 A1* | 9/2018 | Betzer | E02D 27/18 |

FOREIGN PATENT DOCUMENTS

| | | | |
|---|---|---|---|
| CN | 1613717 | A | 5/2005 |
| CN | 102359119 | A | 2/2012 |
| CN | 204940320 | U | 1/2016 |
| CN | 106049525 | A | 10/2016 |
| CN | 106592619 | A | 4/2017 |
| CN | 108643223 | A | 10/2018 |
| DE | 102010026117 | A1 | 3/2011 |
| EP | 1268947 | A1 | 1/2003 |
| EP | 2006471 | A1 | 12/2008 |
| EP | 2363214 | A1 | 9/2011 |
| GB | 288077 | A | 4/1928 |
| JP | S4977704 | A | 7/1974 |
| JP | S61162634 | A | 7/1986 |
| JP | H11287096 | A | 10/1999 |
| JP | 2000170182 | A | 6/2000 |
| JP | 2004156205 | A | 6/2004 |
| JP | 2012241505 | A | 12/2012 |
| JP | 2015034430 | A | 2/2015 |
| KR | 20130094410 | A | 8/2013 |
| TW | 302309 | B | 4/1997 |
| WO | 0171105 | A1 | 9/2001 |
| WO | 2013117197 | A2 | 8/2013 |

OTHER PUBLICATIONS

Extended European Search Report in related European Serial No. 17186731.0, dated Jan. 30, 2018. 7 bages.
Office Action in related Japanese Patent Application No. 2020-530725 dated Jul. 1, 2021. 4 pages.
Office Action in related Japanese Patent Application No. 2020-530725 dated May 10, 2021. 11 pages.
Office Action in related Chinese Patent Application No. 201880068058.6 dated May 31, 2021. 12 pages.

* cited by examiner

SEGMENTED SUCTION BUCKET

CROSS-REFERENCE TO RELATED APPLICATIONS

This application claims priority to PCT Application No. PCT/EP2018/071938, having a filing date of Aug. 13, 2018, based on EP 17186731.0, having a filing date of Aug. 17, 2017, the entire contents of both are hereby incorporated by reference.

FIELD OF THE TECHNOLOGY

The following relates to a segmented suction bucket for a seabed foundation for an offshore facility. Furthermore, the following relates to a method to manufacture such a suction bucket.

BACKGROUND

A suction bucket can effectively be described as an upturned bucket that is embedded in the marine sediment. This embedment is either achieved through pushing or by creating a negative pressure inside the cavity of the suction bucket; both of these techniques have the effect of securing the bucket into the sea bed. The suction bucket can also be relatively easily removed by reversing the installation process, i.e. by applying an overpressure inside the cavity of the suction bucket.

Suctions buckets and their use have been described as early as in 1927, cf. the British patent GB 288077. Various designs have been proposed to ease installation of the suction buckets, as e.g. disclosed in the international patent applications WO 01/71105 A1 or WO 2013/117197.

The suction bucket installation is currently widely used within the oil and gas offshore industry. Today more than 2000 suctions anchors are installed in mostly normal consolidated clay and at water depth up to more than 1000 m.

Typically, suction buckets are made of steel and comprise a lid and a sidewall. The sidewall is also referred to as the bucket skirt. The bucket skirt may be made as one piece or may be segmented into plural bucket skirt segments.

A conventional suction bucket has a cylindrical or conical shape, wherein its cross section in a plane which is substantially parallel to the lid is elliptical, oftentimes circular. In addition, it is known to combine several components of cylindrical shape to one suction bucket.

Suction buckets are generally challenging to manufacture and require considerable material.

It is thus a desire to facilitate the manufacturing process of a suction bucket for a seabed foundation for an offshore facility. Furthermore, it is desirable to reduce the amount of material which is needed to achieve a given stability and load bearing capability of the suction bucket.

SUMMARY

According to the embodiments of the present invention, there is provided a suction bucket for a seabed foundation for an offshore facility, wherein the suction bucket comprises a lid and a sidewall, and is arranged for being embedded into a marine sediment, e.g. by creating a negative pressure inside the cavity of the suction bucket (in the context of this patent application, the cavity is defined by the lid and the sidewall of the suction bucket). Furthermore, the sidewall is segmented into a first circumferential segment and at least a second circumferential segment, wherein the first circumferential segment is connected with the second circumferential segment, and the first circumferential segment and the second circumferential segment are attached to the lid of the suction bucket. In addition, the first circumferential segment and the second circumferential segment each contains at least one substantially planar section.

Suction buckets are also referred to as suction caisson, suction anchors (e.g. for floating structures) or suction piles.

All known suction buckets for offshore applications feature a curved sidewall. The curvature of the sidewall or sidewall segments has the drawback that its manufacture is relatively complicated. Due to the typically enormous size of suction buckets for offshore facilities, which can easily have a diameter exceeding five meters, very specialized machines are needed for manufacturing and providing these curved bucket skirts or bucket skirt segments.

The embodiment of the present invention proposes to divide the suction bucket in a plurality of circumferential segments and to design these circumferential segments such that they comprise at least one substantially planar section. In other words, according to the embodiment of the present invention, the sidewall of the suction bucket comprises at least partially planar sections instead of the entirely round and curved sidewall in prior art suction buckets.

The advantage of the provision of at least one substantially planar section is that manufacturing of the circumferential segment of the sidewall is significantly facilitated, because different machinery can be used. In the case of bucket skirts made of e.g. steel, it is much easier to manufacture a bucket skirt segment substantially consisting of one or more flat plates, instead of a bent bucket skirt segment comprising a curvature with a given radius. In the case that the circumferential segment containing the at least one substantially planar section is compared with a conventional bucket skirt segment with different curvatures, the savings regarding the manufacturing costs is even more apparent.

There is yet a second advantage of using circumferential segments with one or several substantially planar sections extending from the bottom of the suction bucket to the lid: If at least partially planar segments instead of curved segments are used, the wall thickness can be chosen smaller while maintaining the same overall stability and load bearing capacity of the structure. Roughly speaking, a flat plate can be made thinner than a bent, i.e. curved structure, assuming the same load to be supported by the component. The savings in material has the consequence that the total cost of providing the bucket skirt segment is decreased.

In summary, by providing a segmented suction bucket sidewall and by ensuring that the first circumferential segment and the second circumferential segment of the segmented suction bucket sidewall each contains at least one substantially planar section extending from the bottom of the suction bucket to the lid, manufacturing of the suction bucket is facilitated and the total cost of the work piece is reduced.

The lid may be designed according to known specifications in the art, i.e. it may comprise one or more inlets to allow water/air to be pumped out of the interior of the bucket when placed on the seabed as to allow creation of a vacuum. It can be of any shape as long as it covers the top of the sidewalls and functions as a top sealing, e.g. it can be conical or flat.

The suction bucket is designed as to be used for receiving a cable/chain, e.g. for anchoring a vessel or a floating foundation, or means to receive and support a pile, e.g. a monopile of a wind turbine or other off-shore installations (gas/oil or sub-station) or piles for a tripod/quadropod support structure for an offshore installation. Thus the lid or the "skirt" (i.e. sidewall) of the suction bucket may be equipped with receiving means wherein the receiving means may be supported with one or more stiffening legs.

In an embodiment of the present invention, the first circumferential segment has the shape of a plate.

This has the advantage that manufacturing of the first circumferential segment is simplified to a maximum extent. The connection between two adjacent circumferential segments may be realized by separate connection elements. Alternatively, the circumferential elements may have flanges, e.g. sections which are inclined to the inside or the outside of the suction bucket, which are then connected with each other.

In another embodiment of the present invention, the first circumferential segment comprises a first planar section and at least a second planar section. The first planar section is separated from the second planar section by an edge, and the angle between the first planar section and the second planar section is smaller than one hundred and seventy degrees.

This has the advantage that less segments are needed if—with respect to the cross section of the suction bucket—a polygon with the same amount of corners shall be realized. Also note that stability of the sidewall of the suction bucket may improve, if the sidewall has an increased number of edges.

In one embodiment, several of these segment structures are connected on top of another as to prepare the full and final height of the suction bucket.

Advantageously, however, both the first planar section and the second planar section extend from the bottom of the suction bucket to the lid.

This allows to best possibly benefit from the advantages of planar sections at the sidewall of the suction bucket, as described above.

In a specific embodiment of the present invention, the first circumferential segment comprises three, four or five planar sections. Additionally, two adjacent planar sections are separated by a respective edge, and all edges are substantially parallel to each other.

Regarding the number of planar sections per circumferential segment, a compromise between ease of manufacturing, stability and the number of circumferential segments per suction bucket needs to made. Experiences have shown that three, four or five planar sections per circumferential segment represent attractive embodiments of a circumferential segment, i.e. a suction bucket.

In an advantageous embodiment of the present invention, the suction bucket comprises a substantially polygonal cross section, in particular in the plane substantially parallel to the lid.

In other words, it is believed to be advantageous that the sidewall not only comprises sections which are planar, but that it forms a polygon in a cross sectional view. Note that a polygon is understood as a closed chain or "circuit" with a finite number of essentially straight line segments. In yet other words, it is believed that it is advantageous if the side wall does not have any curved sections in its cross section, in particular in a plane in parallel to the lid.

In an embodiment of the present invention, the sidewall has a conical shape.

In particular, the sidewall could be described as a truncated cone, or frustum. Even more particularly, the sidewall could be designed as a polygonal frustum, i.e. a truncated cone with a polygonal base plane.

However, in another embodiment of the present invention, the sidewall has a cylindrical shape.

This means that the base plane and the top plane are identical and in parallel, and the sidewall is perpendicular to the top and base plane.

An advantage of the cylindrical shape of the sidewall is ease of manufacturing, in particular regarding the circumferential segments, and ease of assembling the circumferential segments and the lid.

In another embodiment of the present invention, the first circumferential segment and/or the second circumferential segment comprises a flange for facilitating connection of both circumferential segments together.

A flange is an alternative to a separately provided connection element. The advantage of the provision of a flange is that the number of elements to be separately transported to site of installation of the suction bucket is reduced. Furthermore, it can be argued that the number of parts to be assembled is reduced.

In an embodiment of the present invention, the connection between the first circumferential segment and the second circumferential segment is a welded connection.

This choice of connection seems to be advantageous as it appears to be a good compromise between resistance and durability on the one side and cost and effort for realizing the connection on the other side.

Note, however, that in principle also other connection concepts such as bolting or gluing are possible.

One preferred material for the circumferential segments is steel. An alternative of steel could be concrete or any combinations thereof, such as reinforced concrete.

In an embodiment of the present invention, the suction bucket further comprises a stiffening element such as a cross beam or a ring stiffener for increasing the stiffness of the sidewall of the suction bucket.

In the interior of the suction bucket, i.e. in the cavity of the suction bucket, one or more beams, e.g. made of steel, may be placed on the sidewall to further strengthen the structure and prevent buckling during placement at or in the seabed. A concrete example includes cross beams from one plate to an opposite plate of the sidewall of the suction bucket. A similar effect can be achieved by placing ring stiffeners in or outside the suction bucket walls.

In addition, the interior of the suction bucket may be divided into separate airtight compartments, as this design will allow differentiated suction during installation and allow for a more precise placement of the bucket. This principle is generally known in the art, and obviously requires at least one inlet per compartment to allow water/air to be pumped out of the interior of the bucket to allow creation of a vacuum.

Further, the suction bucket may be equipped with one or more tools known in the art to ease the placement and positioning of the suction bucket at or below the seabed, e.g. soil vibration tools or nozzles as to allow water and/or lubricants to be applied close to the bucket lower part during placement of the suction bucket (i.e. displacement of clay/soil and/or lower friction when the bucket penetrates through the seabed). Such nozzles are connected to a supply device.

In another embodiment of the present invention, the suction bucket is reinforced by a reinforcement element which is arranged at the outside or at the inside of the sidewall at the connection between the first circumferential segment and the second circumferential segment.

These reinforcement elements may be designed, for example, as T-bars. The main section of the T-bar in the cross sectional view could be attached to flanges, which are provided by the circumferential segments. The "shorter"

section of the T-bar could be used to reinforce the structure and seal a potential gap between the first and second circumferential segment of the suction bucket.

Exemplarily, the reinforcement element could be extended until a central portion above the lid of the suction bucket, where it is arranged to be connected with a component of the offshore facility, such as a tower or a transition piece.

Thus, a further reinforcement effect of the structure of the suction bucket can be achieved.

The embodiment of the present invention is further directed to a method to manufacture a suction bucket for a seabed foundation for an offshore facility according to one of the embodiments as described above, wherein the method comprises the following steps:

providing a first circumferential segment, a second circumferential segment and a lid, connecting the first circumferential segment with the second circumferential segment such that a sidewall of the suction bucket is created, and attaching the first circumferential segment with the second circumferential segment to the lid of the suction bucket.

Advantageously, assembly of the suction bucket takes place at the harbor (e.g. at the quay).

Although in principle any suitable method for connecting the first and the second circumferential segment together can be used, a way connect both segments is realized by welding, in particular by hybrid arc welding.

In one embodiment the interfaces between plates or the interface between a plate and a separate structure (such as a tube) are welded together—in full length along the plates.

An example of a separate structures is e.g. a T-beam, a simple (flat) plate or a box-like beam (in the form of a, hollow, tube), which is placed in between the plates, or combinations thereof. The mentioned separate structure, which is also referred to as "connection element", between each plate or every pair (or higher e.g. triple pair) of plates is to be provided as long as the distribution between these separate structures and plates follow an identical pattern around the full circumference of the suction bucket. The box-beam may comprise 4, 5, 6 or more sides, and thus represent a tube when placed along the circumferential segments.

Numerous welding techniques are known in the art. The welding is done in accordance with an automated process e.g. using robots.

One advantageous method would be the "Laser Hybrid welding method", which is a type of welding process that combines the principles of laser beam welding and arc welding. The method has proven to provide a very high deep-weld effect, while minimizing the overall welding process time. The method requires less groove preparation to achieve a deep weld penetration and lower heat input compared to traditional arc welding.

By example, the European patent application EP 2 363 214 A1 describes the use of such technique for welding hollow structures (butt-joints between adjacent plates). The Hybrid welding method is also advantageous when two overlapping plates (or more depending on material thickness) are to be joined due to its deep weld penetration (and thus a good alternative to the traditional welded lap-joint illustrated above). Accordingly, the method allows the overlapping plates, e.g. a flange-to-flange connection, to be joined within the overlapping sections rather that at the end points.

Although depending on how the plates to be joined are designed, two overlapping flanges can be welded together in full length in just a few turns. Accordingly, the welded connection point(s) are placed within the suction bucket skirt along one flange side which provides sufficient bonding between the plates. Optionally the plates can be welded on both sides and even on the outside joint. This method is especially advantageous when a "tube" is placed between the plates, as welding within the hollow tube is rather difficult if not impossible.

Concerning thickness of the plates, thicker plates obviously provide more strength to the bucket but on the account of weight and steel prize. Nonetheless, a thickness in the range of 5-25 mm, 10-20 mm, more particularly 15-18 mm, has proven to be sufficient for the required strength of the structure.

BRIEF DESCRIPTION

Some of the embodiments will be described in detail, with reference to the following figures, wherein like designations denote like members, wherein.

DETAILED DESCRIPTION

Figure 1:
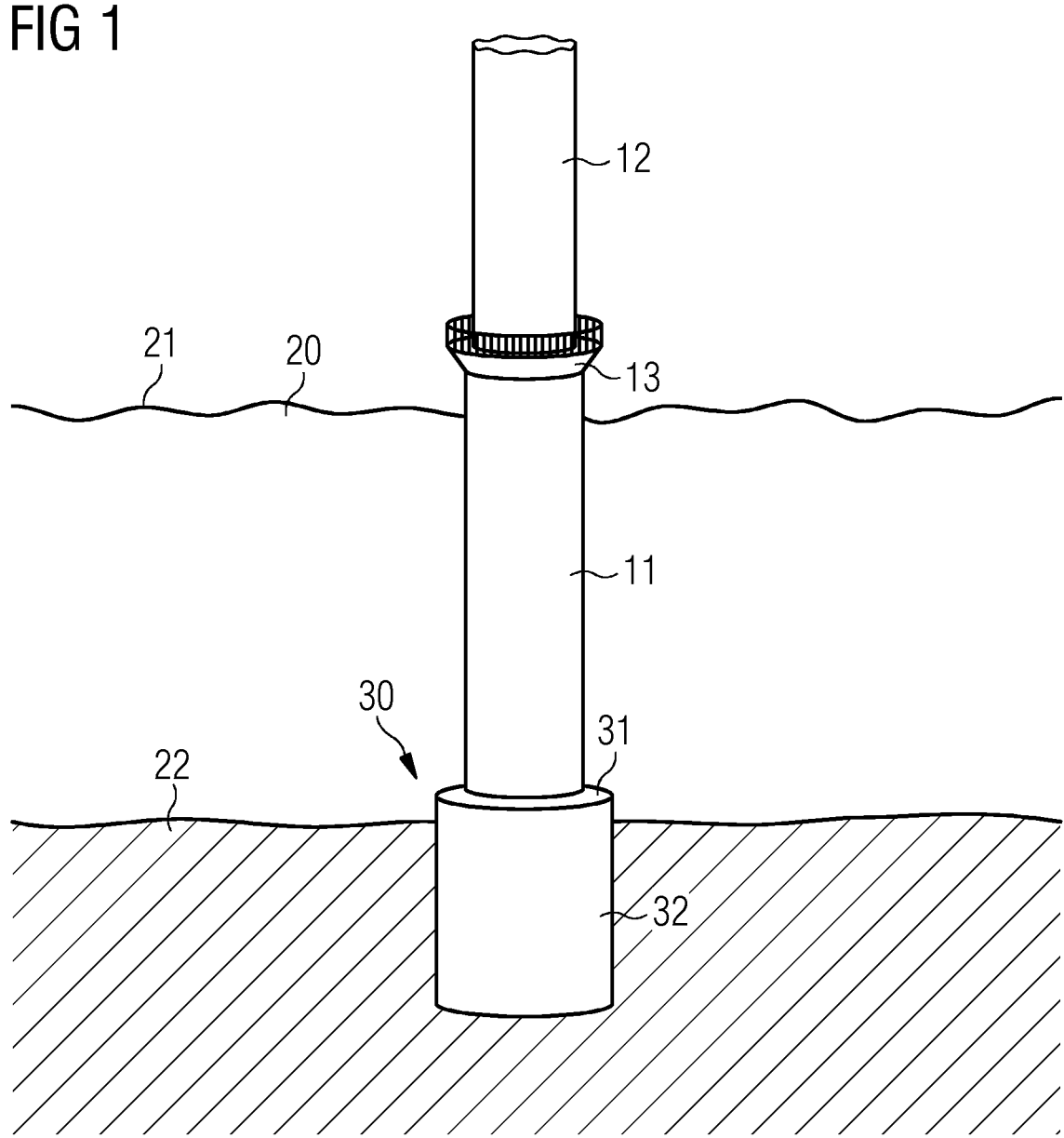
FIG. 1 shows a part of a wind turbine which is embedded into marine sediment by help of a suction bucket.

In the following, the embodiments illustrated in the accompanying drawings are described in more detail. It is to be understood that the following description is only illustrative and non-restrictive. The drawings are only schematic representations, and the elements in the drawings are not necessarily to scale with each other. Furthermore, the drawings only show a limited number of components, or parts of components, and it is to be understood that further components not shown in the drawings may be present. The components shown are selected order to facilitate the understanding of the illustrated embodiments.

FIG. 1 shows a part of a wind turbine which is embedded into marine sediment 22 by help of a suction bucket 30. A wind turbine is just an example of an offshore facility for which the suction bucket according to the embodiment is suited. Other examples for offshore facilities include gas or oil rigs (i.e. offshore gas or oil platforms) or substations for offshore wind farms.

In FIG. 1, a part of a tower 12 of a wind turbine is illustrated, wherein the tower 12 is not directly mounted at the seabed foundation, i.e. the suction bucket 30. Moreover, the tower 12 is attached at the suction bucket 30 via a so-called transition piece 11. At the connection between the transition piece 11 and the tower 12, a platform 13 for providing easy access for service personnel is provided. Typically, the top end of the transition piece 11 is a few meters above sea level 21 during average tidal height of the sea 20.

Suctions buckets for offshore facilities are usually huge structures with a diameter of no less than seven meters. In case that the offshore facility, such as the wind turbine, rests on one single foundation (which is referred to as "monopod", compared to e.g. tripods or other jacket support structures), the diameter may even exceed fifteen meters. Suction buckets are usually manufactured by welding steel plates together into a cylindrical form on which a top plate, which is referred to as a lid, is placed. For instance, the lid is welded on top of the cylindrical walls leaving the bottom open. The structure is so designed as to be air and water tight when placed under sea level.

When installing the suction bucket it is mounted on the seabed soil facing the aperture of the bucket unit downward. When the inside of the bucket is sealed by the seabed surface, the inside water and/or air is drained forcibly using a pump, resulting in difference of hydraulic pressure between inside and outside of the bucket unit. The suction force generated by the difference of pressure is used as a press force to submerge the bucket unit onto the seabed soil.

The lid itself can in principle be removed after placement of the suction bucket in the seabed as it on some designs essentially serves no other purposes than provide an air tight sealing during placement. If so after removal, the top part of the bucket can be protected by another layer such as a grout material to prevent any material inside the bucket from being flushed away by the surrounding water flow.

The suction bucket can be placed at its desired location as such without being connected to any of the structures that it is supposed to support, but can advantageously be placed when pre-mounted to a structure, e.g. a wind turbine support structure.

Figure 2:
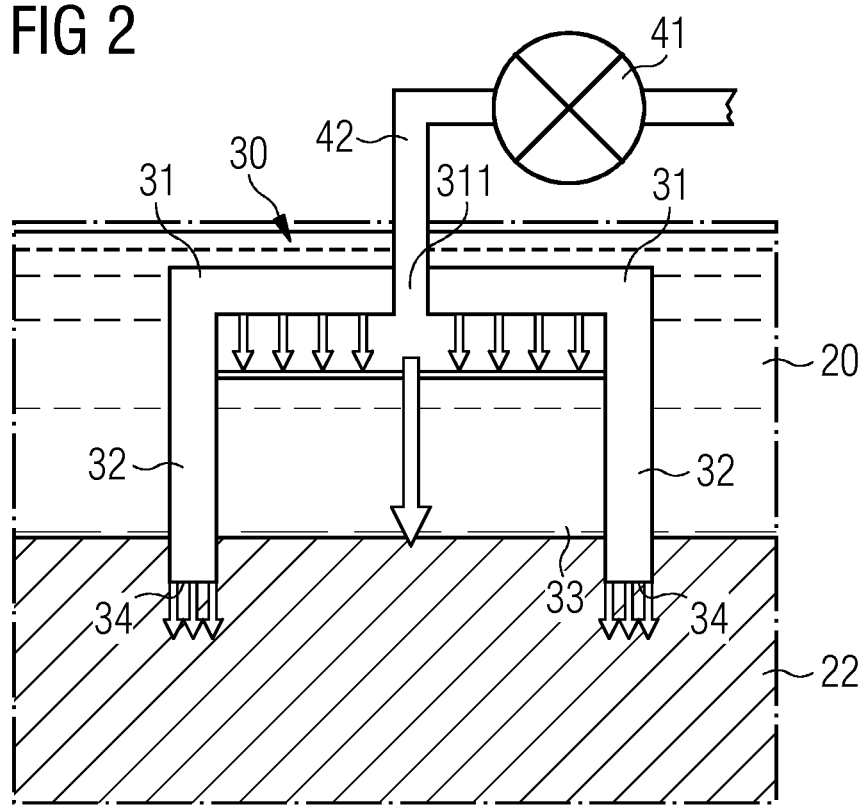
FIG. 2 shows process of embedding the suction bucket into the marine sediment.
Figure 3:
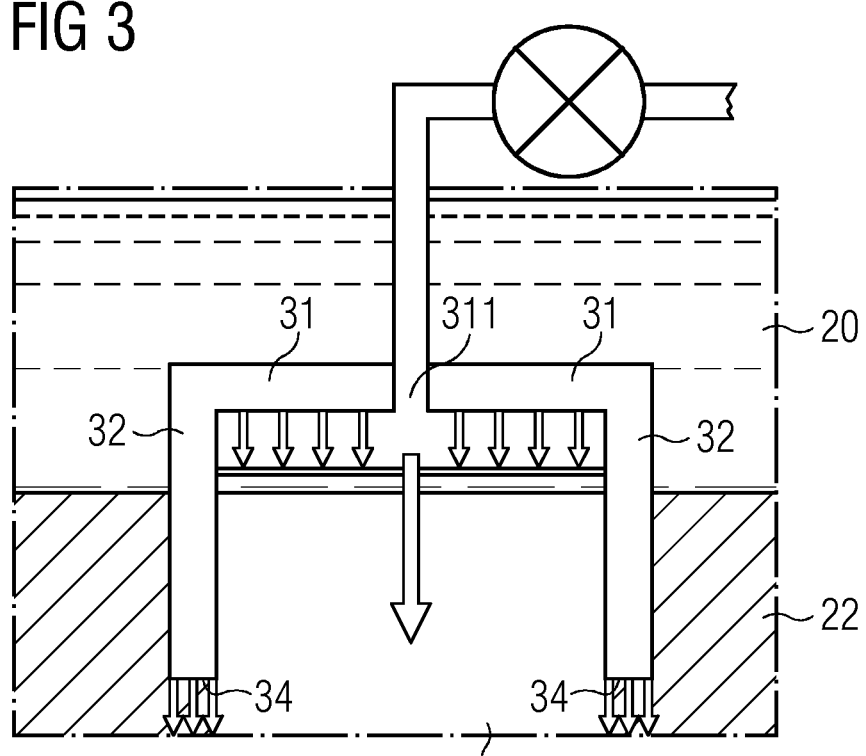
FIG. 3 shows a process of embedding the suction bucket into the marine sediment.

FIGS. 2 and 3 schematically show the process of embedding a suction bucket 30 into the marine sediment 22. The suction bucket 30 comprises a sidewall 32 and a lid 31. The lid 31 is closely attached to the sidewall 32 at the top of the suction bucket 30. At the bottom 34 of the suction bucket 30, the suction bucket is open therefore, the structure of the suction bucket 30 resembles an upturned bucket, which is the reason why the suction bucket 30 is also named a "suction bucket".

The lid 31 comprises an opening 311. The opening 311 is destined for providing an access to a drainage channel 42. The drainage channel is configured to enable to forcibly drain water and/or air out of the inside of the suction bucket 30, the "cavity" 33 of the suction bucket 30. This process is realized by a suitable pump 41. In practice, the pump 41 may be located at the deck of a vessel and the drainage channel 42 may extend from the opening 311 of the lid 31 to the vessel, being located near the suction bucket 30.

Figure 4:
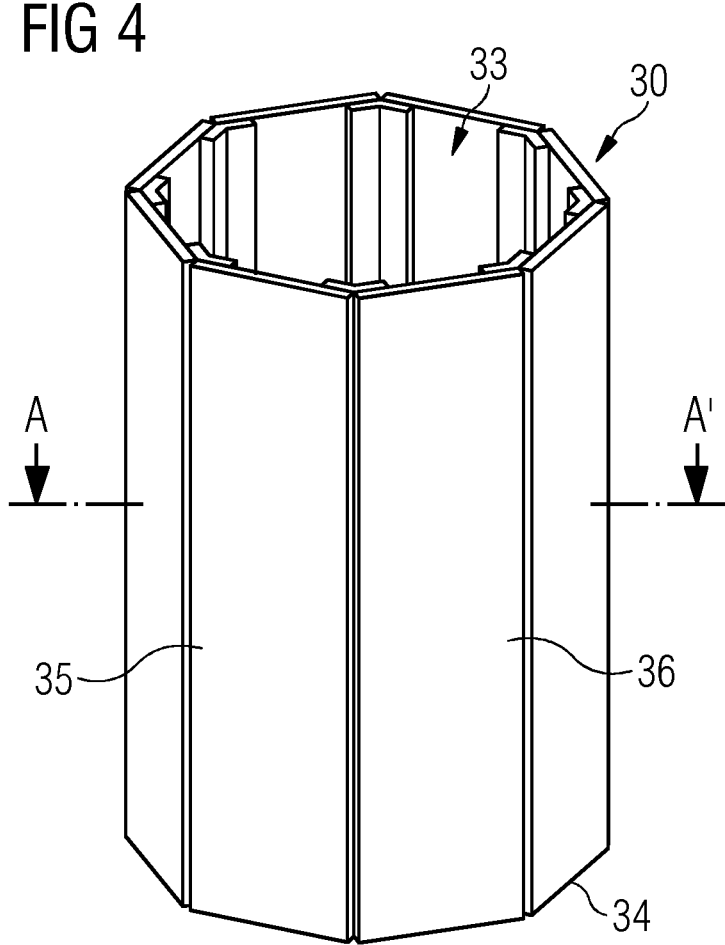
FIG. 4 shows a schematic example of a suction bucket in a perspective view.
Figure 5:
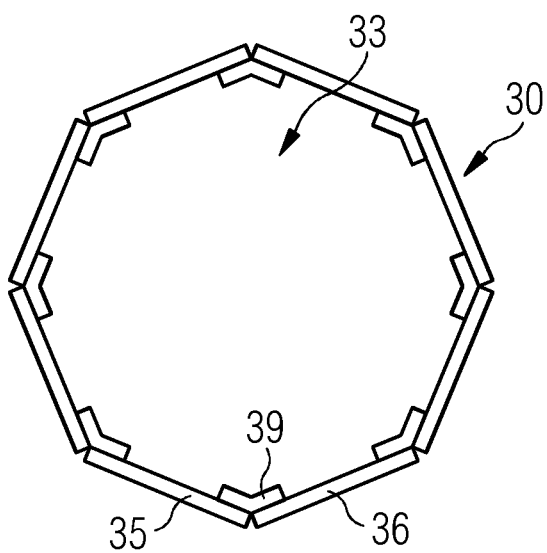
FIG. 5 shows a cross sectional view at the plane A-A' of the exemplary suction bucket of shown in FIG. 4.

FIGS. 4 and 5 illustrate in schematic drawings an example of a suction bucket 30 according to the embodiment of the present invention. The exemplary suction bucket 30 comprises eight circumferential segments, namely a first circumferential segment 35, a second circumferential segment 36 and six further circumferential segments. The suction bucket 30 also comprises a lid, wherein the lid is not shown in FIG. 2 for sake of clarity. All eight circumferential segments extend from the bottom 34 of the suction bucket 30 to the top. In contrast to conventional designs of the "bucket skirt", i.e. the sidewall of a suction bucket, the sidewall is not curved, i.e. round or bent, but contains a number of planar sections. In the example shown in FIGS. 4 and 5, each of the circumferential segments, in particular the first circumferential segment 35 and the second circumferential segment 36, is configured as one flat plate. These eight flat plates are arranged in a regular manner towards each other and are connected with each other via separate connection elements 39. The connection elements are arranged inside the suction bucket 30, i.e. in the cavity 33 of the suction bucket 30.

The suction bucket 30 can thus be described as having a cylindrical shape with a polygonal cross section, as can be well discerned in FIG. 5, which is a cross section in the plane A-A' of the suction bucket 30.

Figure 6:
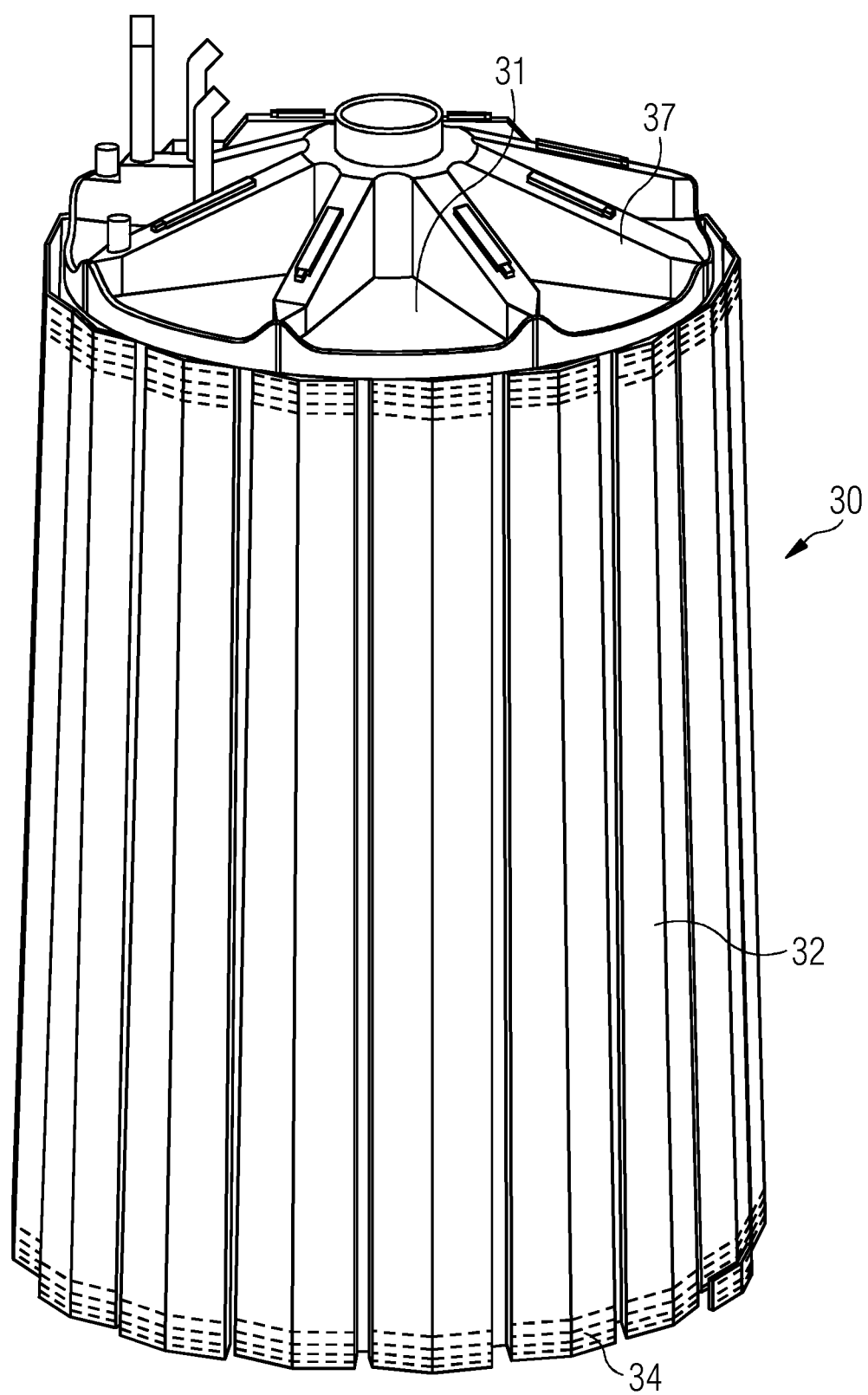
FIG. 6 shows a first embodiment of a suction bucket in a perspective view.

FIG. 6 shows a first embodiment of a suction bucket 30 in a perspective view. The suction bucket 30 again comprises a plurality of circumferential segments, all of them extending from the bottom 34 of the suction bucket 30 to its top. At the top, a lid 31 is welded onto the circumferential segments which build the sidewall 32 of the suction bucket 30. The suction bucket 30 has a slightly coned shape, which means that the diameter of the suction bucket 30 at the bottom 34 is slightly smaller than at the top.

FIG. 6 also shows reinforcement elements 37 arranged at the lid 31 for stabilizing the entire structure. The reinforcement elements 37 extend from the sidewall 32 to a central portion above the lid 31, wherein the central portion is prepared to receive a supporting element for supporting an offshore facility. In case of a wind turbine, the supporting element could e.g. be realized as a transition piece.

Figure 7:
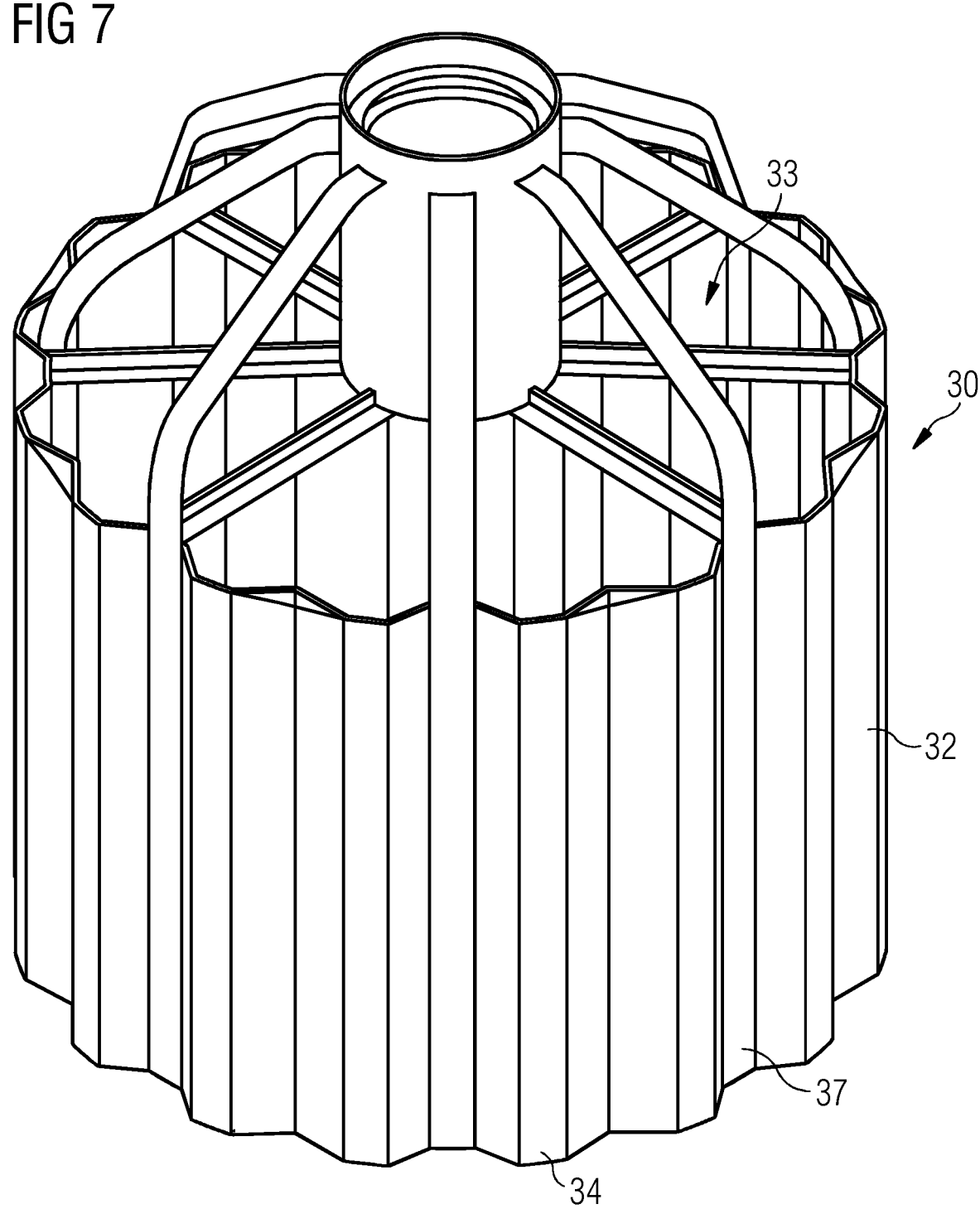
FIG. 7 shows a second embodiment of a suction bucket in a perspective view.

FIG. 7 shows a second embodiment of a suction bucket 30 in a perspective view. The suction bucket 30 comprises a plurality of circumferential segments, all of them extending from the bottom 34 of the suction bucket 30 to its top. At the top, a lid is foreseen, but has been omitted in FIG. 7 in order to show a part of the cavity 33 of the suction bucket 30. The sidewall 32 of the suction bucket contains sixteen circumferential segments. Each circumferential segment comprises three planar sections. In addition, each circumferential segment comprises flanges at both ends (not visible in FIG. 7) for facilitating connection of adjacent circumferential segments with each other.

The embodiment disclosed in FIG. 7 also comprises a plurality of cross-beams, which act as stiffening elements 38 for the suction bucket. The cross-beams extend from the sidewall to a central portion of the suction bucket 30. Again, the central portion is prepared to receive a supporting element for supporting an offshore facility.

Another specific feature of the suction bucket 30 according to this embodiment are the reinforcement elements 37 which aim to reinforce the structure of the suction bucket 30. The reinforcement elements 37 are realized as T-bars. They extend from the central portion above the lid along the sidewall down to the bottom 34 of the suction bucket 30. Note that one reinforcement element 37 is provided for every second circumferential segment. Thus, in total, there are provided eight T-bars for further reinforcing and stiffening the structure of the suction bucket 30.

FIGS. 8-15 show different design proposals for a sidewall 31 of a suction bucket 30. The proposals differ in the number, arrangement and design of the individual circumferential segments which together constitute the sidewall. FIGS. 8, 10, 12 and 14 illustrate perspective views of the different embodiments; FIGS. 9, 11, 13 and 15 show an enlarged view of a part of a cross-sectional view of the associated embodiment.

In general, some designs are based on a plate-to-plate connection (optionally with a sealing in between), others rely on a connection joint wherein a separate structure, e.g. a T-beam, a simple (flat) plate or a box-like beam (in the form of a, hollow, tube), is placed in between the plates, or combinations thereof. The mentioned separate structure, which is also referred to as "connection element", between each plate or every pair (or higher e.g. triple pair) of plates is to be provided as long as the distribution between these separate structures and plates follow an identical pattern around the full circumference of the suction bucket. The box-beam may comprise 4, 5, 6 or more sides, and thus represent a tube when placed along the circumferential segments.

Further, each plate may advantageously comprise one or more bends out- or inwards, as seen from the inside of the suction bucket rather than being a plain flat surface. The bends point outwards, as this has proven to further strengthen the overall suction bucket structure and minimize an overall buckling of the bucket during placement in the seabed. In this respect, buckling is understood as an instability of a structure often observed at thin walled structures due to compressive stresses in the structure.

The width (and height) of the plates can be matched to provide a certain diameter of the suction bucket, or the number of plates per suction bucket can be modified to the desired diameter. In the disclosed examples, the designs for mono-buckets are typically of an outer diameter of fifteen to twenty meters and ten meters in height, whereas the other suction buckets are designed for jacket support structures and are of a diameter of seven to twelve meters and exemplarily eight meters in height.

Figure 8:
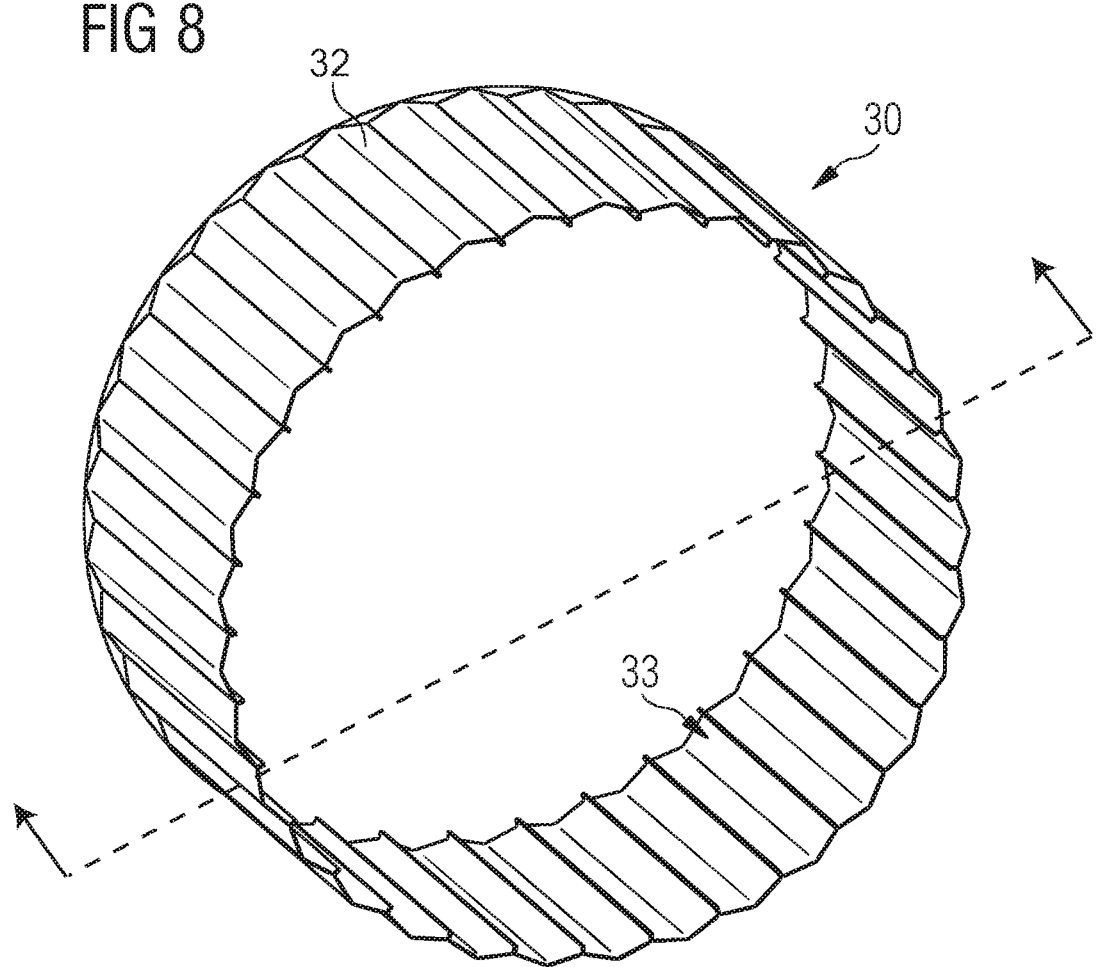
FIG. 8 shows a first design of the segmented sidewall of the suction bucket in a perspective view.

FIG. 8 shows a perspective view of the first design of a segmented sidewall of a suction bucket. The sidewall 32 contains thirty-three identical circumferential segments, wherein a first circumferential segment is connected to a second one; the second one is connected to the first one and a third one; the third one is connected to the second one and a fourth one; and further on. All circumferential segments are arranged and prepared to be attached to a lid of the suction bucket.

Figure 9:
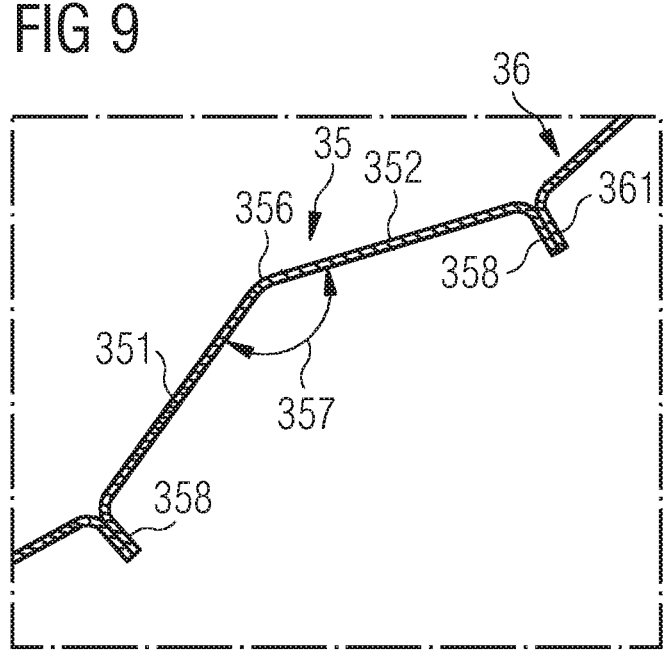
FIG. 9 shows the first design of the segmented sidewall of the suction bucket in a cross-sectional view.

FIG. 9 shows an enlarged cross-sectional view of the first circumferential segment 35. The first circumferential segment 35 contains a first planar section 351 and a second planar section 352. Both planar sections 351, 352 extend from the bottom of the suction bucket to the lid (which is not visible in FIGS. 8 and 9). The first planar section 351 is arranged in an angle 357 of smaller than one hundred and seventy degrees with the second planar section 352. In other words, both planar sections 351, 352 are bent outwards. This has the technical effect of strengthening the structure and increasing the load bearing capacity of the suction bucket. As a consequence, the risk of buckling of the structure of the suction bucket, in particular of the sidewall, is reduced. This is particularly advantageous during the process of driving the suction bucket into the marine sediment, as relatively high forces apply on the structure of the suction bucket during the period.

The first planar section 351 and the second planar section 352 are separated by an edge 356. At the opposite end of the planar sections, a flange 358 is provided, respectively. The function of the flange 358 is to facilitate connection of the first circumferential segment with adjacent segments. In the view shown in FIG. 9, the flange 358 adjacent to the second planar section 352 is connected with a flange 361 of the second circumferential segment 36, for instance.

Figure 10:
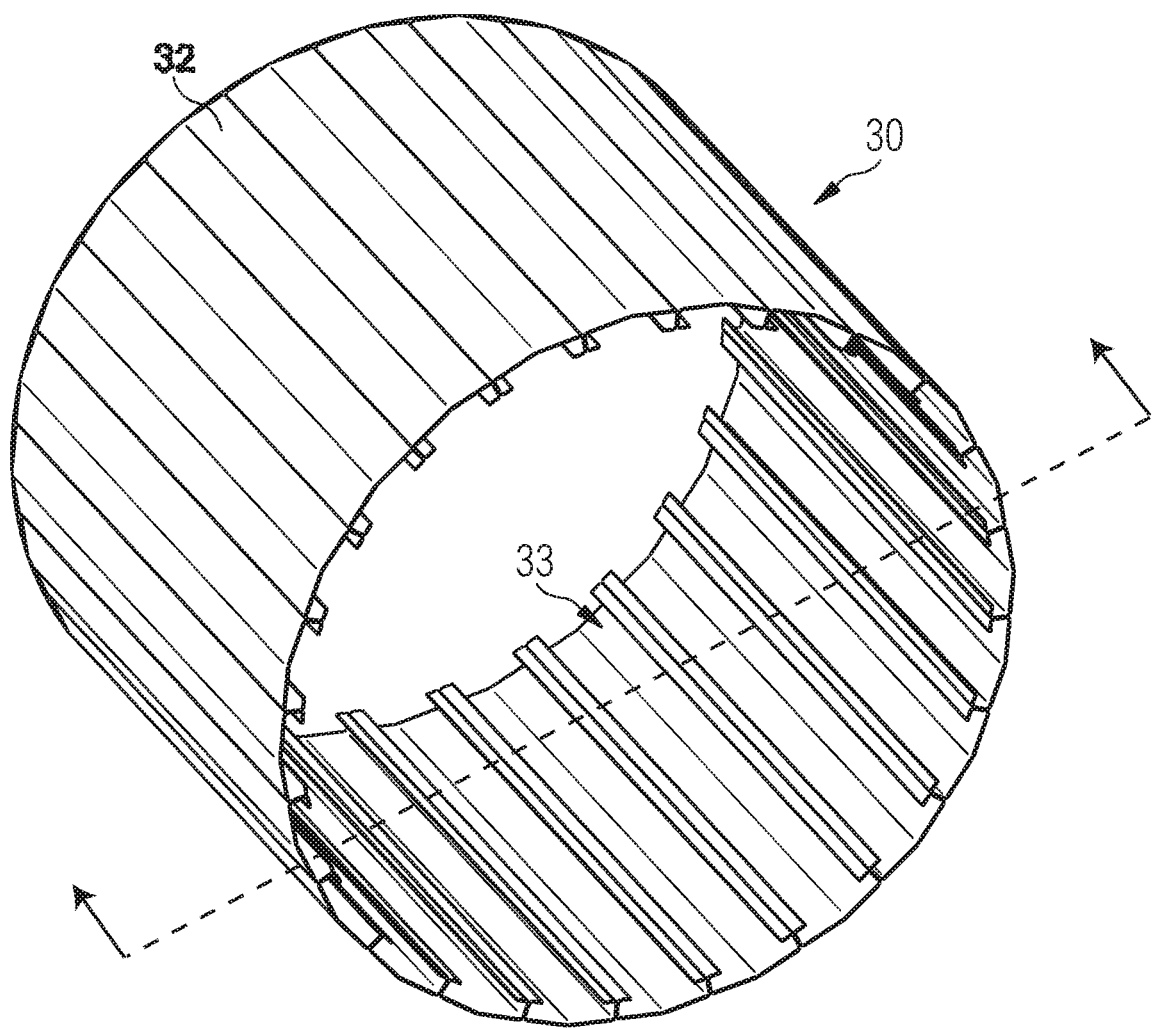
FIG. 10 shows a second design of the segmented sidewall of the suction bucket in a perspective view.
Figure 11:
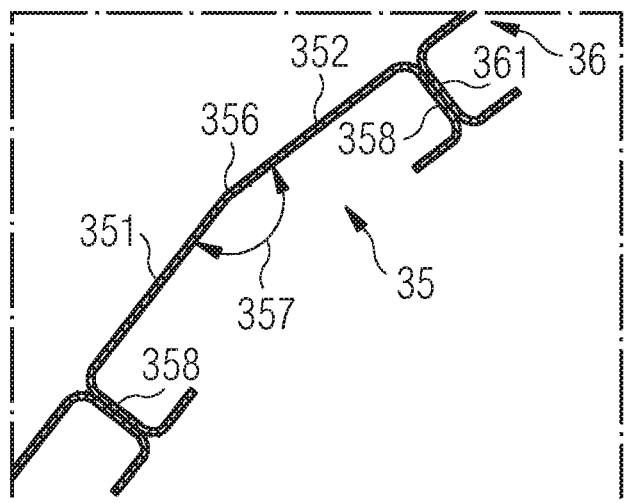
FIG. 11 shows the second design of the segmented sidewall of the suction bucket in a cross-sectional view.

FIGS. 10 and 11 show a second design of a segmented sidewall. The overall structure is similar to the first design, therefore only the most relevant differences will be discussed below.

The flanges 358 of the first circumferential segment 351 comprise a second bend such that a C-shape of the two end sections of the first circumferential segment 351 is created. Obviously, all circumferential segments are designed with this type of flanges.

Figure 12:
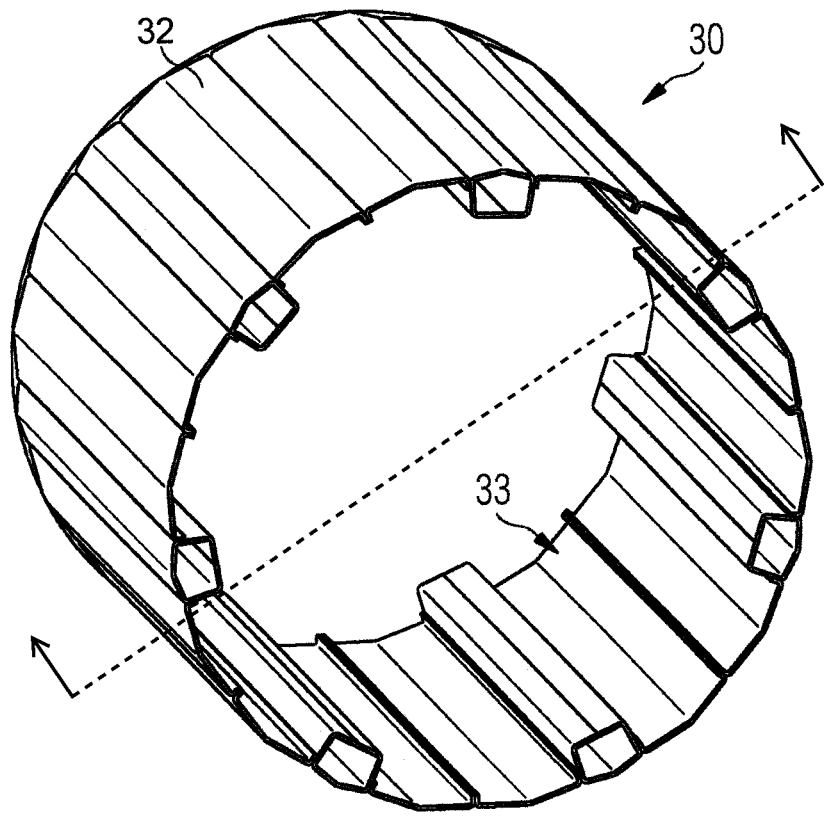
FIG. 12 shows a third design of the segmented sidewall of the suction bucket in a perspective view.
Figure 13:
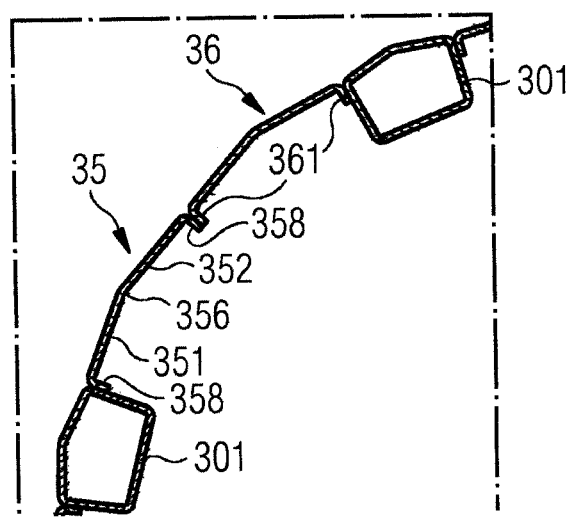
FIG. 13 shows the third design of the segmented sidewall of the suction bucket in a cross-sectional view.

FIGS. 12 and 13, which illustrate a third design option for the segmented sidewall of a suction bucket, show box-shaped corner elements 301 which are provided for every second circumferential segment. These box-shaped corner elements 301 are another way to increase the stability of the structure without allowing an excessively high material consumption.

Figure 14:
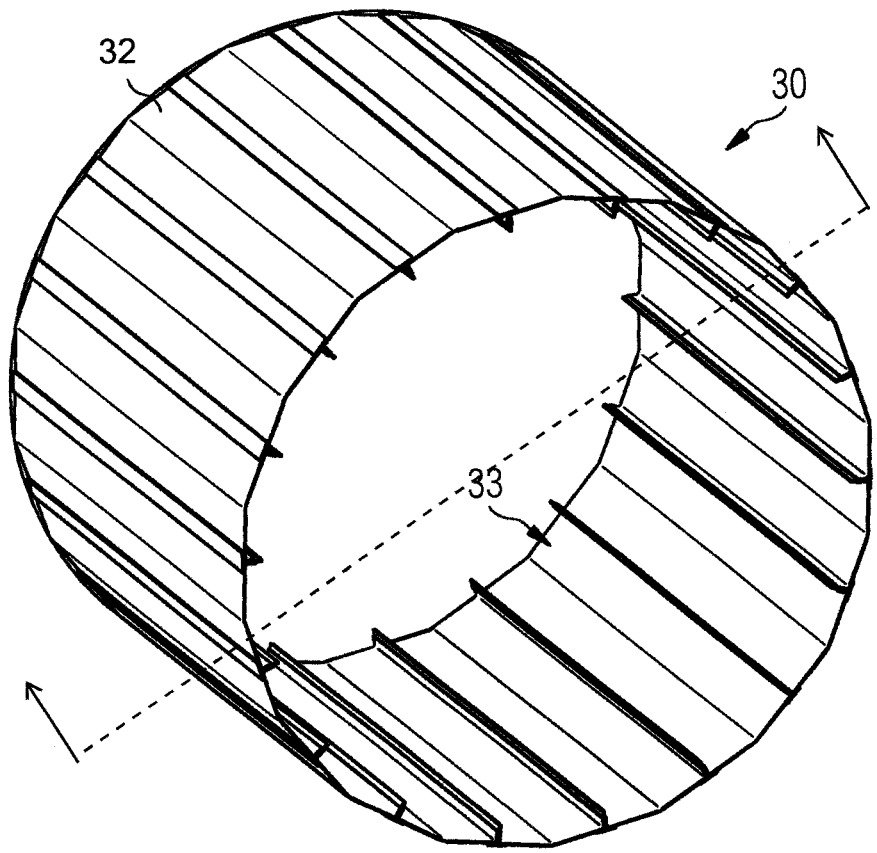
FIG. 14 shows a fourth design of the segmented sidewall of the suction bucket in a perspective view.
Figure 15:
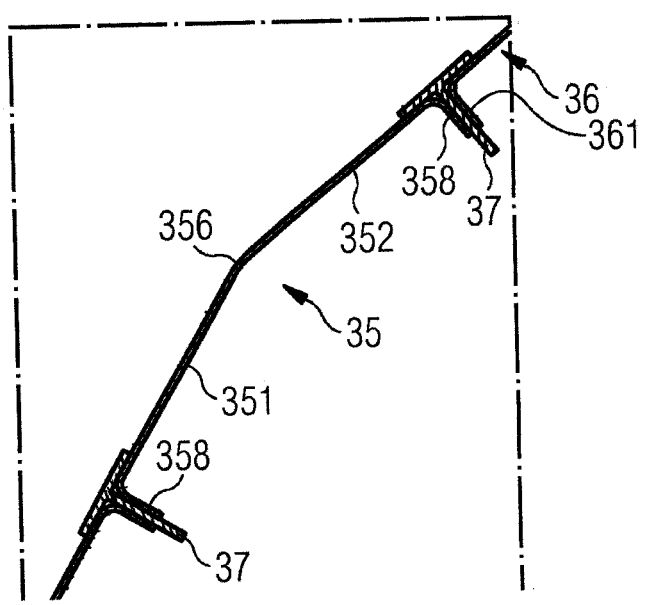
FIG. 15 shows the fourth design of the segmented sidewall of the suction bucket in a cross-sectional view.

Finally, FIGS. 14 and 15 show a design option with a reinforcement element 37 with a T-shape. These reinforcement elements 37 are arranged between the flanges 358, 361 of adjacent circumferential segments 35, 36. In addition, the reinforcement elements comprise one part, which is present at the outside of the suction bucket, i.e. which stands out from the sidewall. The reinforcement elements 37 disclosed in FIGS. 14 and 15 may well be designed such that they extend until a central portion above the lid, as e.g. shown in FIG. 7.

Figure 16:
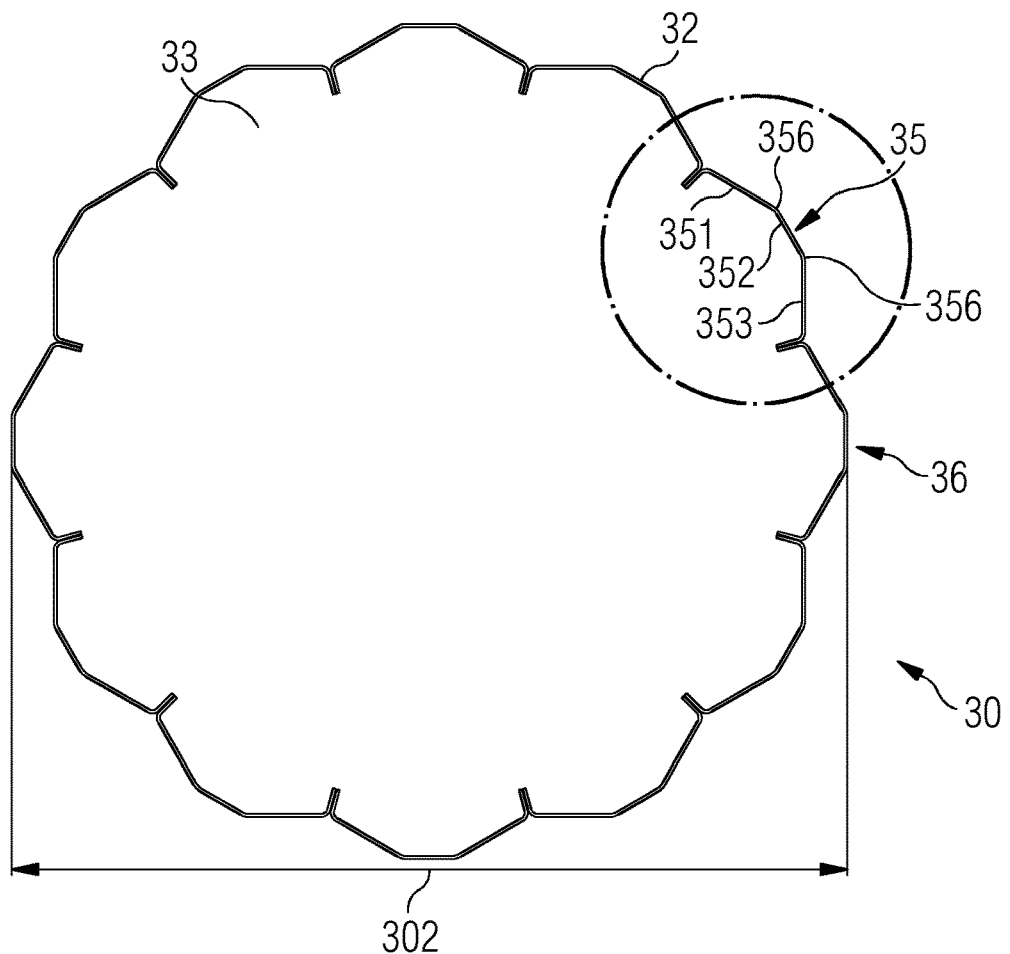
FIG. 16 shows a fifth design of the segmented sidewall of the suction bucket in a cross sectional view.
Figure 17:
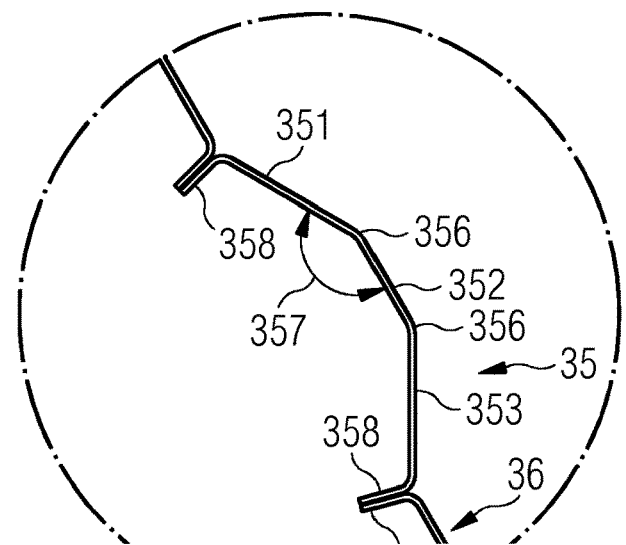
FIG. 17 shows an enlarged view of a part of the fifth design as shown in FIG. 16.

FIGS. 16 and 17 show a fifth design of a segmented sidewall of a suction bucket. Again, the individual segments are designed and arranged such that they form a polygon in cross-sectional view. In other words, the sidewall has the characteristics of a closed loop composed by a plurality of straight lines.

The example of FIG. 16 comprises twelve circumferential segments, namely the first circumferential segment 35, the second circumferential segment 36 and ten further circumferential segments. All circumferential segments are equal in size and shape, having an overall width 302. Each circumferential segment comprises three planar sections and two flanges. The planar sections are separated or sub-divided from each other by edges. The edges are oriented substantially parallel to each other.

FIG. 17 is an enlarged view of the encircled section of FIG. 16, showing the first circumferential segment 35 in detail. It can be seen that the first circumferential segment 35 comprises a first planar section 351, a second planar section 352 and a third planar section 353. Each planar section is adjacent to an edge 356.

Furthermore, the planar sections are "bent outwards" for increasing the structural stability of the suction bucket sidewall. In particular, the angle 357 between the first planar section 351 and the second planar section 352 is, in the exemplarily design of FIGS. 16 and 17, one hundred and fifty degrees. To give further dimensions, the diameter of the entire suction bucket is around six meter the individual circumferential segments are approximately 1.5 meters.

Although depending on how the plates to be joined are designed, two overlapping flanges can be welded together in full length in just a few turns. Accordingly, the welded connection point(s) are placed within the suction bucket skirt, i.e. within the cavity delimited by the sidewall, along one flange side which provides sufficient bonding between the plates. Optionally the plates can be welded on both sides and even on the outside joint. This method is especially advantageous when a "tube" is placed between the plates, as welding within the hollow tube is rather difficult if not impossible.

Figure 18:
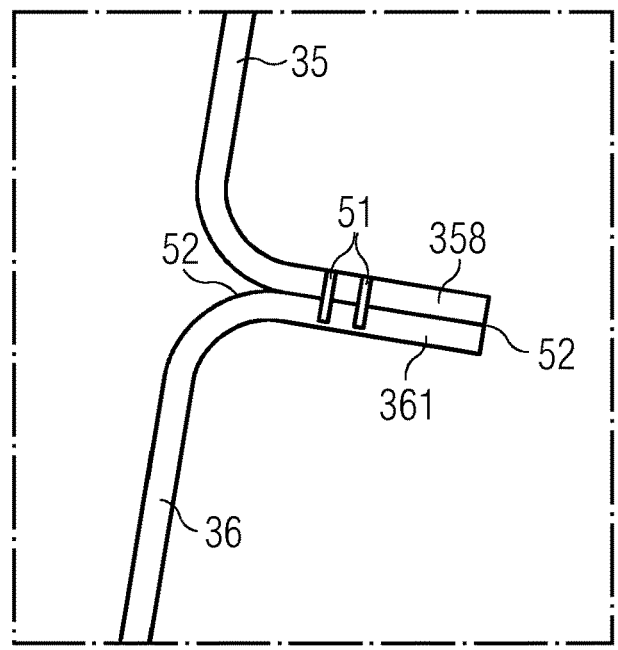
FIG. 18 shows a first example of a welded connection between two adjacent circumferential segments.

FIG. 18 shows an example of two overlapping flanges 358, 361 which are welded at (necessary) welding points 51 and optionally at additionally welding points 52.

Figure 19:
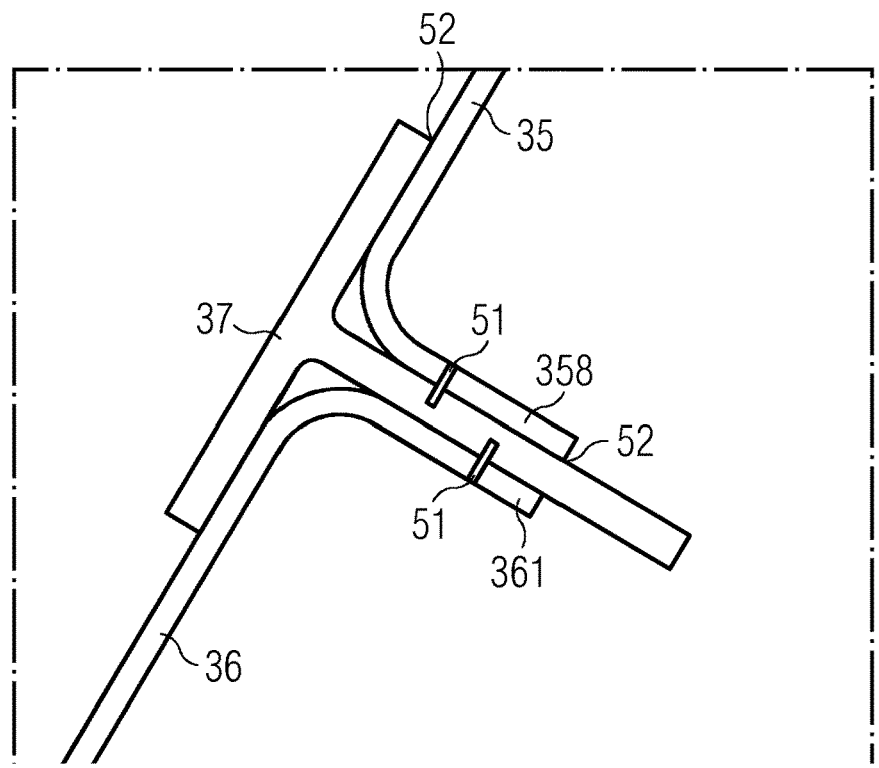
FIG. 19 shows a second example of a welded connection between two adjacent circumferential segments.

Similarly, FIG. 19 shows an example of two overlapping flanges 358, 361, in between which a reinforcement member 37, designed as a T-bar, is inserted. Again, (necessary) welding points 51 and (optionally) additional welding points 52 are illustrated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A suction bucket for a seabed foundation for an offshore facility, the suction bucket arranged for being embedded into a marine sediment, the suction bucket comprising:
   a lid and a sidewall, wherein:
   the sidewall is segmented into a first circumferential segment and at least a second circumferential segment;
   the first circumferential segment is connected with the second circumferential segment,
   the first circumferential segment and the second circumferential segment are attached to the lid of the suction bucket;
   the first circumferential segment and the second circumferential segment each contain a plurality of substantially planar sections separated from each other by an edge with an angle formed between the substantially planar sections;
   the first circumferential segment and the second circumferential segment comprises a flange for facilitating connection of the first circumferential segment to the second circumferential segment; and
   the sidewall includes a plurality of box-shaped corner elements arranged on an inner side of the sidewall.

2. The suction bucket according to claim 1, wherein:
   the first circumferential segment comprises a first planar section and at least a second planar section,
   the first planar section is separated from the second planar section by an edge, and
   an angle between the first planar section and the second planar section is smaller than one hundred and seventy degrees.

3. The suction bucket according to claim 2, wherein both the first planar section and the second planar section extend from a bottom of the suction bucket to the lid.

4. The suction bucket according to claim 1, wherein:
   the first circumferential segment comprises three, four or five planar sections,
   two adjacent planar sections are separated by a respective edge, and
   all edges are substantially parallel to each other.

5. The suction bucket according to claim 1, wherein the suction bucket comprises a substantially polygonal cross section in a plane substantially parallel to the lid.

6. The suction bucket according to claim 1, wherein a connection between the first circumferential segment and the second circumferential segment is a welded connection.

7. The suction bucket according to claim 1, wherein both the first circumferential segment and the second circumferential segment are made of steel.

8. The suction bucket according to claim 1, wherein the suction bucket further comprises a stiffening element, the stiffening element being a cross beam or a ring stiffener for increasing a stiffness of the sidewall of the suction bucket.

9. The suction bucket according to claim 1, wherein the suction bucket is reinforced by a reinforcement element which is arranged at an outside of the sidewall at a connection between the first circumferential segment and the second circumferential segment.

10. The suction bucket according to claim 9, wherein the reinforcement element is extended until a central portion above the lid of the suction bucket, where the central portion is arranged to be connected with a component of the offshore facility.

11. A method to manufacture the suction bucket for the seabed foundation for the offshore facility according to claim 1, the method comprising:
   providing the first circumferential segment, the second circumferential segment and the lid,
   connecting the first circumferential segment with the second circumferential segment such that the sidewall of the suction bucket is created, and
   attaching the first circumferential segment with the second circumferential segment to the lid of the suction bucket.

12. The method according to claim 11, wherein the connection between the first circumferential segment and the second circumferential segment is realized by hybrid arc welding.

13. The suction bucket according to claim 1, wherein the plurality of box-shaped corner elements are provided for every second circumferential segment of the sidewall.

14. The suction bucket according to claim 1, wherein the sidewall is cone shaped.

* * * * *